United States Patent [19]

Schoenfelder

[11] 4,398,529

[45] Aug. 16, 1983

[54] SOLAR HEATING WALL

[76] Inventor: James L. Schoenfelder, 128½ E. Washington St., Iowa City, Iowa 52240

[21] Appl. No.: 313,294

[22] Filed: Oct. 21, 1981

[51] Int. Cl.³ .............................................. F24J 3/02
[52] U.S. Cl. .................................... 126/436; 126/435; 126/448; 126/450; 126/400; 52/220; 52/612; 52/807
[58] Field of Search ............... 126/422, 430, 435, 436, 126/437, 400, 450, 442, 448, 452, 432; 165/10, 48 S, 18; 52/220, 221, 807, 612

[56] References Cited

U.S. PATENT DOCUMENTS

| | | | |
|---|---|---|---|
| 4,037,583 | 7/1977 | Bakum et al. | 126/435 |
| 4,069,973 | 1/1978 | Edwards | 126/430 |
| 4,125,108 | 11/1978 | Porter et al. | 126/436 |
| 4,132,074 | 1/1979 | Wendel | 126/400 |
| 4,147,300 | 4/1979 | Milburn, Jr. | 126/400 |
| 4,187,831 | 2/1980 | Eubank | 126/400 |
| 4,194,496 | 3/1980 | Carlson | 126/430 |
| 4,241,782 | 12/1980 | Schoenfelder | 126/400 |
| 4,257,481 | 3/1981 | Dobson | 126/436 |
| 4,273,102 | 6/1981 | Anthony | 126/435 |

FOREIGN PATENT DOCUMENTS 2395469  2/1979  France ............................ 126/436

Primary Examiner—James C. Yeung
Attorney, Agent, or Firm—Zarley, McKee, Thomte, Voorhees & Sease

[57] ABSTRACT

A solar heating wall including a water pipe circulation system having a plurality of separate tubes, each formed as a loop, connected between a water supply and a return. The separate tubes are arranged in a single vertical plane at the approximate center of the wall. The wall is formed within a frame which is packed with a material suited for use as a thermal reservoir, such as concrete. The frame provides extra support by having a series of horizontally disposed cross supports on one surface of the wall and a series of vertically disposed cross supports on the opposite surface. A pressure relief valve may be provided between the water supply to the separate tubes and the water supply to the building or structure containing the solar wall, so that the solar wall can be adapted for use with a city water system.

6 Claims, 4 Drawing Figures

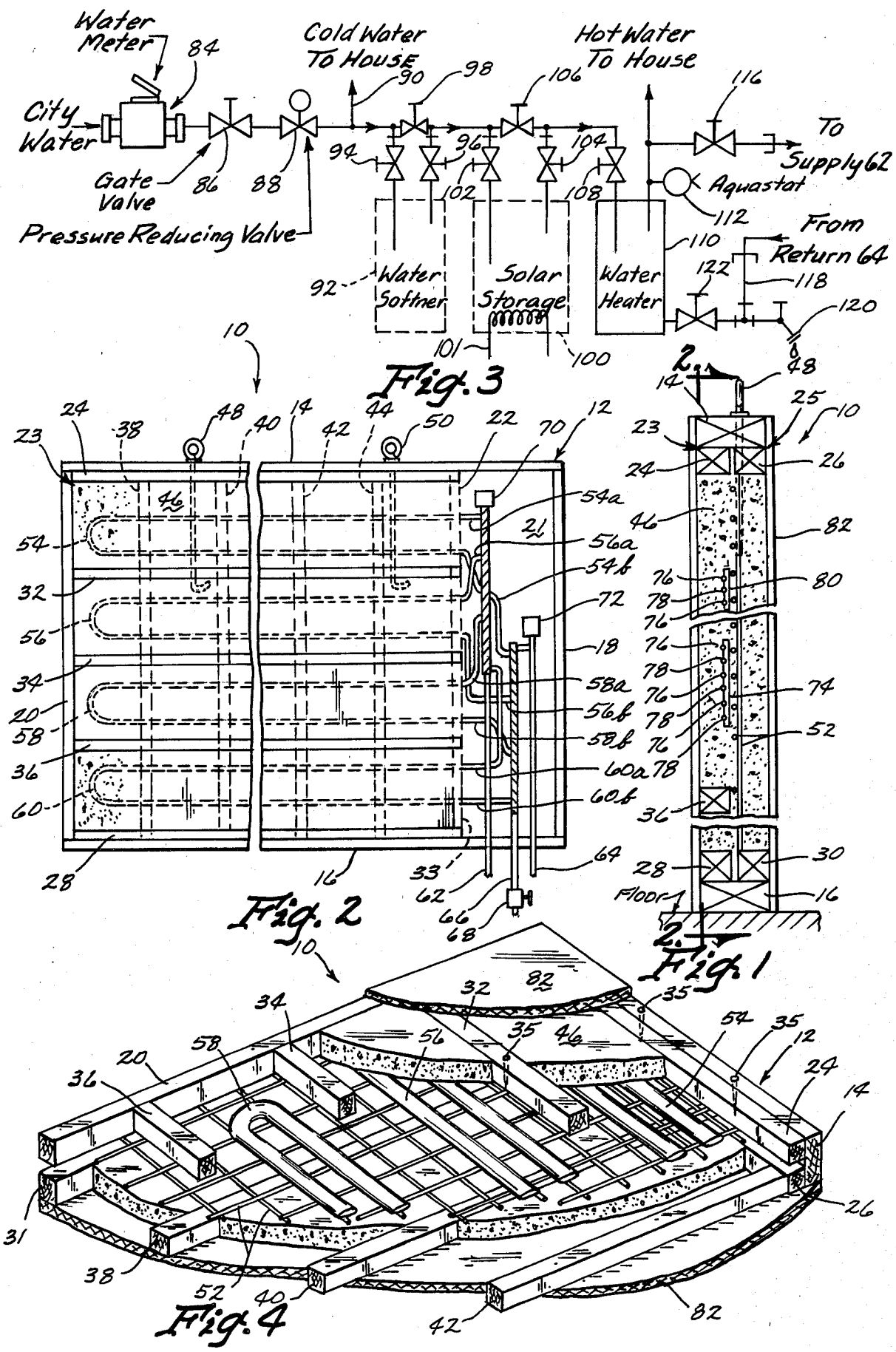

SOLAR HEATING WALL

BACKGROUND OF THE INVENTION

Circulating water systems have been used in the past in active solar heating systems to transfer solar energy into concrete floor slabs. However, if a concrete floor slab is used to cover a basement, a great deal more support for the floor is needed than with a conventional wood floor. This, in turn, increases the expense of the structure employing a slab floor. Further, because the concrete floor serves as a thermal reservoir to facilitate thermal conduction and radiation to the surrounding air, the surface area of the floor exposed to and in contact with the surrounding air is an important factor in determining the rate of heat transfer. A heating system which provides more surface area of the thermal reservoir in contact with the air within the building to be heated than is afforded in floor heating systems, is thus desirable. Furthermore, prior solar water circulating heating systems have used a piping system separate from the potable water system of the building, thus increasing the cost of the solar system.

Accordingly, it is an object of the present invention to provide an improved water circulating solar heating system for a commercial or residential structure.

It is a further object of the present invention to provide a water circulating solar heating system which maximizes surface area in contact with the living space within a structure.

It is a further object of the present invention to provide a water circulating solar heating system which is adapted to use potable water supplied through city water systems.

It is a further object of the present invention to utilize the walls of a residential or commercial structure as the thermal reservoir in a circulating, solar water heating system.

It is a further object of the present invention to provide a frame for a concrete wall which is economical and affords good support.

It is a further object of the present invention to provide a solar wall structure which can be easily constructed by personnel at the building site.

It is a further object of the present invention to provide a solar wall structure which is economical in manufacture, efficient in use, and strong in construction.

SUMMARY OF THE INVENTION

A water circulating, solar heating system is shown on the drawings and utilizes a solar heating wall. The wall frame includes on one side a four member rectangular main frame with horizontally disposed, evenly spaced cross supports along one face of the main frame. On the other face of the frame are vertically disposed, evenly spaced cross supports.

A series of separate water circulation tubes formed into single loops lies in single vertical plane in the frame. Each separate tube extends from a supply pipe (which is connected to the water source of the structure) to a return pipe (which is connected to the drain of the structure's water system). The separate loops are horizontally disposed and extend substantially along the entire length of the wall. The supply and return pipes for the separate circulation tubes are located adjacent one another in a cavity formed at one end of the wall's frame.

The exterior surfaces of the cross supports lie flush with the exterior edges of the main frame. The frame, except for the cavity, is filled with concrete which serves as a thermal reservoir. Two spaced lifting lugs are set in the concrete at the top of the frame. A solar collector which receives incident sunlight is connected to a solar storage unit which stores thermal energy, and which is placed in the structure's water system between a pressure reducing valve and the inlet to the circulating tubes. The pressure reducing valve limits the water pressure supplied to the structure to 30 psi.

BRIEF DESCRIPTION OF THE DRAWINGS

FIG. 1 is a shortened sectional view of the solar heating wall.

FIG. 2 is a shortened sectional view of the solar heating wall taken along line 2—2 of FIG. 1.

FIG. 3 is a schematic of the plumbing system connected to the solar heating wall.

FIG. 4 is a partial perspective view of the wall showing portions broken away.

DESCRIPTION OF THE PREFERRED EMBODIMENT

The numeral 10 generally refers to a solar heating wall of this invention. The basic structure of wall 10 is two rectangular frames 23, 25 which are formed of conventional 2×2 stock. Frame 23 is formed by a side member 20, a top horizontal member 24, a bottom horizontal member 28, and three interior horizontal members 32, 34, 36. There is no vertical member at the right hand side as viewed in FIG. 2 of frame 23. Immediately below frame 23 is a mesh reinforcing wire 52 which rests on top of frame 25.

Frame 25 is comprised of an upper horizontal member 26, a lower horizontal member 30, outer vertical side members 31, 33, and interior vertical members, 38, 40, 42, and 44. Thus frame 23 includes horizontal members 24, 28, 32, 34, 36 whereas in contrast frame 25 includes only vertical members 38, 40, 42, 44. Horizontal members 24, 28 34, 36 of frame 23 are secured in place by nails 35 which extend downwardly into the frame 25 below so as to secure frames 23, 25 together.

An outer rectangular wall frame 12 is formed by securing an upper plate 14 and a lower plate 16 in covering relation over the top members 24, 26 and the bottom members 28, 30 of interior frames 23, 25. Plates 14, 16 are preferably of twice the thickness of frames 23, 25. Furthermore, plates 14, 16 protrude beyond the right hand edge (as viewed in FIG. 2) of frames 23, 25. Plates 14, 16 are interconnected by a stud 18 to form a rectangular cavity 21.

Interior frames 23, 25 are filled between vertical support member 22 and vertical member 20 with a material 46 which can be packed therein and is substantially solid or will form into a substantially solid mass. Preferably this packing material 46 is concrete. Extending through frame member 14 are two lift lugs 48 and 50 which lie in a vertical plane in the approximate center of wall 10. Lugs 48 and 50 extend into and are set in packing material 46.

A series of separated water circulation tubes 54, 56, 58 and 60 are formed into individual loops. Each tube rests on top of mesh wire 52 (as viewed in FIG. 2) and extends horizontally from the cavity 21 into one of the horizontal spaces formed between horizontal members 32, 34, 36 of frame 23. The water circulation tubes are all disposed in the same vertical plane adjacent and parallel to the reinforcing wire mesh 52.

One end of each separated water circulation tube, i.e., the intake end identified as 54a, 56a, 58a and 60a, respectively, is connected to a water supply pipe 62 as shown in FIG. 2. Similarly, the return end of each water circulation tube, i.e., 54b, 56b, 58b and 60b, respectively, is connected to the same system return pipe 64 by way of drain pipe 66. Drain valve 68 on drain pipe 66 and air vents 70 and 72 atop supply pipe 62 and return pipe 64, respectively, complete the water circulation piping within main frame 12.

The tubes used are currently commercially available under the trade designation SolaRoll, and are sold by Bio-Energy Systems, Inc. of Ellenville, N.Y. Each tube includes a plurality of tubes (usually 6) which are joined together by flexible plastic. FIG. 1 illustrates how these tubes appear in section, but FIGS. 2 and 4 illustrate the tubes schematically rather than in full size.

The cross sectional view shown in FIG. 1 is a true representation of the preferred embodiment. In particular, circulating tube set 74 includes a cross-sectional view of three identical supply tubes 76 and three identical return tubes 78 placed in the preferred compacted position. Similarly, FIG. 1 shows a cross sectional, partial view of a second tube set 80 wherein two supply tubes 76 and one return tube 78 are shown. A suitable covering material 82 (FIG. 4), such as sheet rock or masonite, can be utilized to finish the exterior and interior surfaces of wall 10.

The construction of wall 10 is simple and can be done by a carpenter during the construction of a house. The entire wood frame and wire mesh are built and assembled on the floor. Next concrete is poured through the wire mesh 52 until frame 25 is completely filled to the level of wire mesh 52. Then tubes 54, 56, 58, 60 are laid in place between the horizontal members 32, 34, 36 of frame 23. The tubes 54, 56, 58, 60 are preferably pressurized prior to being covered with concrete. Concrete is then poured within interior frame 23 so as to completely cover tubes 54, 56, 58, 60. The wall may be lifted to a vertical position by means of hooks 48, 50 and sheet rock 82 sheets can then be attached to both faces of the wall.

FIG. 3 is a schematic of the plumbing located on the exterior of main frame 12 which connects to supply 62 and return 64. From left to right in FIG. 3, water from a supply such as city water (which would pass through a water meter 84) leads to gate valve 86. A pressure reducing valve 88 which reduces the water pressure (which is typically 60 psi) to 30 psi is the next item in the plumbing system. A cold water supply 90 is then conventionally connected to the various cold water taps.

Water softener 92 is placed in the system and it includes an intake valve 94 and outlet valve 96 as well as a bypass valve 98. Water softener 92 is followed by a solar storage unit 100 which receives water from inlet valve 102. Outlet valve 104 permits water to be drawn out of storage unit 100. Bypass valve 106 is positioned between valves 102, 104.

Solar storage unit 100 includes a heat exchanger coil 101 in the bottom thereof, and coil 101 is connected to a solar collector (not shown) which collects heat from the sun. Coil 101 and the solar collector are connected in a closed fluid system which uses glycol or other suitable fluid to carry the heat from the solar collector to heat exchanger 101. Exchanger 101 transfers heat to the water in storage unit 100 which is potable water coming from the city water supply. Thus, the potable water is preheated while in the storage unit.

After solar storage unit 100, another inlet valve 108 joins the plumbing to water heater 110. An aquastat 112 is connected to the water heater outlet pipe 114. Pipe 114 leads to the various hot water taps in the structure, as well as to supply 62 by way of valve 116. Pipe 118 connects to return 64 and leads to drain 120. Drain valve 122 leads from the base of the water heater to drain 120. Thus, the present system utilizes the structure's potable water supply and supplements the structure's water heating system.

The cold water line may be placed before or after the pressure reducing valve 88. Similarly, the relative positions of the other valves may be varied so long as the water heater and the solar storage tank are located after pressure reducing valve 88.

In operation, valve 116 is simply opened to allow water heated by water heater 110 and solar storage unit 100 to enter supply 62, thus filling circulation tubes 54, 56, 58 and 60. Primarily by conduction, heat will be transferred from the hot water within the circulation tube to packing material 46. By conduction and radiation, the thermal energy within packing material 46 will be transferred into the air in contact with the exterior and interior surfaces of wall 10. The relatively large volume of the packing material 46 as compared to the volume of the water circulating through the various circulating tubes, allows for the storage of much more thermal energy than can be obtained within the circulating water at any given time. The packing material 46 will radiate and conduct heat into the surrounding air at a rate depending on the thermal conductivity of the packing material 46 and the covering material 82, the movement of the surrounding air and the humidity in the surrounding air, as is well known. The number of solar walls utilized in a particular structure is, of course, discretionary with the owner, however, it is clear that a much larger surface area containing circulating water tubes can be placed in contact with the air within a given structure by utilizing several solar walls as opposed to the use of a solar, circulating water, concrete floor slab.

Placement of cross supports 32, 34, and 36 perpendicular to oppositely disposed cross supports 38, 40, 42, and 50 provide support for the packing material 46 when the wall 10 is flexed along either its height or its width. If flexed along either direction, one or the other sets of cross supports serves to assist main frame members and cross beams of main frame 12 and reinforcing mesh 52.

It is obvious that the dimensions and materials utilized in the construction of solar wall 10 can vary greatly. Copper tubing is preferred for supply pipe 62 and return pipe 64, but various materials will suffice. Similarly, the number and shape of the various circulating tubes is not crucial, but clearly it is preferable to have the largest possible surface area of circulating tubes in contact with the packing material 46 per unit volume of water circulated therethrough. Further, good thermal contact between the circulating tubes and the packing material is preferable. Other packing material and materials for the frame of wall 10 can be utilized with the only limitation being cost. If circulating tubes of sufficient strength are utilized, it is possible for the pressure reducing valve to be deleted and a city water supply can then be directly fed to the solar plumbing system. Further, the solar walls can be used in conjunction with a circulating water, concrete floor slab, but additional support for the floor will then be needed. Many other variations within the scope of the claims will be obvious to those skilled in the art.

It is clear from the above description that all of the above stated objectives are met by the present invention.

What is claimed is:

1. A water heatable wall for a structure comprising:
   a first rectangular frame having a first upper horizontal frame member, a first lower horizontal frame member, and a plurality of parallel vertical studs extending between said first upper and first lower frame members;
   a second rectangular frame having at least one vertical side frame member and a plurality of horizontal spaced apart parallel frame members extending across the width of said second rectangular frame;
   said first and second rectangular frames having the same size and being attached to one another in superimposed relationship to form a wall frame having a thickness which comprises the combined thickness of said first and second frames;
   at least one elongated flexible water tube positioned in at least one of the spaces between said spaced apart horizontal frame members of said second frame, said tube having an inlet end and an outlet end extending beyond the outer rectangular edges of said second rectangular frame;
   concrete filling the open areas within said wall frame so as to form a concrete wall having a thickness and shape of said wall frame; and
   said water tubes, said vertical studs of said first frame, and said horizontal members of said second frame being embedded within said concrete.

2. A water heatable wall according to claim 1 wherein an upper plate and a lower plate are attached to the upper and lower edges of said wall frame, said plates extending beyond one of the side edges of said wall frame, a vertical wall stud spaced from said one side edge of said wall frame and interconnecting said upper and lower plates so as to form a wall cavity adjacent said one side edge of said wall frame, said inlet and outlet ends of said water tube extending into said wall cavity.

3. A water heatable wall according to claim 2 wherein a sheet of wire mesh material is positioned between said first and second frames and is embedded within said concrete.

4. A water heatable wall according to claim 1 wherein said second rectangular frame comprises only one vertical said frame member, said horizontal frame members of said second frame each being connected at one end to said vertical said member and extending horizontally across said second rectangular frame.

5. A water heating system comprising:
   a vertical wall formed at least partially from concrete;
   a water tube partially embedded within said concrete wall and having an inlet end and an outlet end extending outside said concrete wall;
   a water inlet pipe adapted to be connected to a source of potable water;
   a solar storage unit adapted to store heat received from a solar collection system;
   a heat exchanger within said solar storage unit and connected to said inlet pipe so as to permit the water from said inlet pipe to be heated by the heat within said solar storage unit;
   a water heater connected to said heat exchanger so as to receive preheated water from said heat exchanger and to further heat said water to a predetermined temperature, said heater having a water outlet connection and a water return connection;
   means connecting said water outlet connection to said inlet end of said water tube, and further connecting said outlet end of said water tube to said return connection of said water heater.

6. A method for constructing a water heatable wall comprising:
   forming a first rectangular frame having a first horizontal upper frame member, a first horizontal bottom frame member, and a plurality of first vertical frame members in spaced apart parallel relation;
   forming a second rectangular frame having at least one vertical side frame member and a plurality of horizontal frame members in spaced apart parallel relation to one another;
   positioning said first frame in registered allignment over said second frame and securing the two together;
   placing at least one flexible water tube within at least one of the horizontal spaces between said horizontal members of said second frame; with the opposite ends of said water tube extending outwardly beyond the outer edges of said first and second frames;
   pouring concrete into the open spaces within said super-imposed registered first and second frames whereby said water tube, said first vertical frame members of said first frame, and said parallel horizontal members of said second frame will be embedded within said concrete, the opposite ends of said water tube extending outside said concrete.

* * * * *